(12) United States Patent
Kim et al.

(10) Patent No.: US 12,126,718 B2
(45) Date of Patent: Oct. 22, 2024

(54) ELECTRONIC DEVICE FOR SELECTING KEY TO BE USED FOR ENCRYPTION ON BASIS OF AMOUNT OF INFORMATION OF DATA TO BE ENCRYPTED, AND OPERATION METHOD OF ELECTRONIC DEVICE

(71) Applicant: Samsung Electronics Co., Ltd., Gyeonggi-do (KR)

(72) Inventors: Bumhan Kim, Gyeonggi-do (KR); Eunbi Kim, Gyeonggi-do (KR); Sunjune Kong, Gyeonggi-do (KR); Hansang Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 531 days.

(21) Appl. No.: 17/421,911

(22) PCT Filed: Jan. 2, 2020

(86) PCT No.: PCT/KR2020/000061
§ 371 (c)(1),
(2) Date: Jul. 9, 2021

(87) PCT Pub. No.: WO2020/149555
PCT Pub. Date: Jul. 23, 2020

(65) Prior Publication Data
US 2022/0103350 A1   Mar. 31, 2022

(30) Foreign Application Priority Data

Jan. 14, 2019   (KR) ........................ 10-2019-0004519

(51) Int. Cl.
*H04L 9/08*   (2006.01)
*G06F 21/60*   (2013.01)
(Continued)

(52) U.S. Cl.
CPC ............ *H04L 9/088* (2013.01); *G06F 21/602* (2013.01); *G06F 21/62* (2013.01); *H04L 9/0861* (2013.01);
(Continued)

(58) Field of Classification Search
CPC ..... H04L 9/088; H04L 9/0861; H04L 9/0894; H04L 9/14; H04L 9/30; H04L 9/3263; G06F 21/602; G06F 21/62
(Continued)

(56) References Cited

U.S. PATENT DOCUMENTS 6,075,858 A     6/2000   Schwartzman
7,313,704 B2 *  12/2007  Kashiwada ............. G06F 21/82
                                                          717/173
(Continued)

FOREIGN PATENT DOCUMENTS

KR      10-0703811       4/2007
KR      10-2009-0041352  4/2009
(Continued)

OTHER PUBLICATIONS

Favored Encryption Techniques for Cloud Storage, Song et al, Mar. 2015 (Year: 2015).*

(Continued)

*Primary Examiner* — Jahangir Kabir
(74) *Attorney, Agent, or Firm* — The Farrell Law Firm, P.C.

(57) ABSTRACT

An electronic device and a method of operating the electronic device are provided. Data corresponding to a user input is received through a user interface of the electronic device. The data is stored in a normal area of a memory of the electronic device. A quantity of information in the stored data is identified. At least one key is selected from a plurality of keys stored in the memory, based on at least the quantity (Continued)

of information. The data is encrypted using the at least one key. The encrypted data and information indicating the at least one key are transmitted to a secure area of the memory, which requires access authority.

13 Claims, 6 Drawing Sheets

(51) Int. Cl.
    *G06F 21/62*     (2013.01)
    *H04L 9/14*     (2006.01)
    *H04L 9/30*     (2006.01)
    *H04L 9/32*     (2006.01)

(52) U.S. Cl.
    CPC ............. *H04L 9/0894* (2013.01); *H04L 9/14* (2013.01); *H04L 9/30* (2013.01); *H04L 9/3263* (2013.01)

(58) Field of Classification Search
    USPC ........................................................ 713/193
    See application file for complete search history.

(56) References Cited

U.S. PATENT DOCUMENTS

| | | | |
|---|---|---|---|
| 2002/0101996 A1* | 8/2002 | Takada | H04L 9/065 380/277 |
| 2004/0109569 A1* | 6/2004 | Ellison | G11B 20/00362 |
| 2006/0008082 A1* | 1/2006 | Gluck | H04L 63/08 380/28 |
| 2006/0112270 A1* | 5/2006 | Erez | G06F 21/46 713/168 |
| 2007/0220616 A1 | 9/2007 | Oh | |
| 2009/0103732 A1 | 4/2009 | Benteo et al. | |
| 2013/0301830 A1 | 11/2013 | Bar-El et al. | |
| 2014/0223189 A1 | 8/2014 | Gao et al. | |
| 2016/0117124 A1 | 4/2016 | Kwon | |
| 2017/0163414 A1 | 6/2017 | Moon | |
| 2018/0109508 A1 | 4/2018 | Wall et al. | |

FOREIGN PATENT DOCUMENTS

| | | |
|---|---|---|
| KR | 10-2013-0125316 | 11/2013 |
| KR | 10-1442539 | 9/2014 |
| KR | 10-2016-0029590 | 3/2016 |

OTHER PUBLICATIONS

PCT/ISA/210 Search Report issued on PCT/KR2020/000061, Apr. 20, 2020, pp. 5.
PCT/ISA/237 Written Opinion issued on PCT/KR2020/000061, Apr. 20, 2020, pp. 4.
Korean Office Action dated Jul. 20, 2023 issued in counterpart application No. 10-2019-0004519, 9 pages.
European Search Report dated Feb. 26, 2024 issued in counterpart application No. 20742072.0-1218, 7 pages.

* cited by examiner

ELECTRONIC DEVICE FOR SELECTING KEY TO BE USED FOR ENCRYPTION ON BASIS OF AMOUNT OF INFORMATION OF DATA TO BE ENCRYPTED, AND OPERATION METHOD OF ELECTRONIC DEVICE

PRIORITY

This application is a National Phase Entry of PCT International Application No. PCT/KR2020/000061 which was filed on Jan. 2, 2020, and claims priority to Korean Patent Application No. 10-2019-0004519, which was filed on Jan. 14, 2019, the content of each of which is incorporated herein by reference.

BACKGROUND

1. Field

Embodiments of the disclosure relate generally to an electronic device and a method of operating the electronic device, and more particularly, to a technology for selecting a key to be used for encryption based on an amount of information in data to be encrypted and encrypting the data using the selected key.

2. Description of Related Art

Various electronic devices have been distributed, such as, for example, smart phones, tablet personal computers (PCs), portable multimedia players (PMPs), personal digital assistants (PDAs), laptop PCs, and wearable devices.

An electronic device may demand user authentication in order for the electronic device to provide a variety of functions. The electronic device may receive information for user authentication that is input by a user, and may compare the information for the user authentication with information configured by the user, so as to perform the user authentication. The electronic device may provide a variety of functions according to the result of the user authentication.

For example, the electronic device may perform user authentication through an operation of receiving a password input by the user and an operation of comparing the input password with a password conventionally configured by the user. The password input by the user may be data implemented by a combination of letters/numbers or data implemented by the user's biometric information (for example, a user's fingerprint, a user's iris, or user's face information). A plurality of modules (for example, various modules including a module for file encryption or a module for switching to an unlocking mode) demanding a password may be implemented in an electronic device, and the plurality of modules may receive a password input by the user and transmit the received password to a password processing module in order to verify the password. The password processing module may transmit the result of verifying the received password to a plurality of modules, and the plurality of modules may determine whether to activate various functions based on the verification result.

In a process in which a password input by a user is transferred to a password processing module for processing a password, the password may be copied several times in the transferring process and the copied password may exist in a partial area of a memory. The password existing in the partial area of the memory may be exposed to an attacker who acquires authority for accessing the memory, and thus, security may be compromised.

SUMMARY

According to an embodiment of the disclosure, an electronic device is provided that includes a user interface, a processor operatively connected to the user interface, and a memory operatively connected to the processor and including a normal area and a secure area. The memory is configured to store a plurality of keys for encrypting data corresponding to a user input, and to store instructions causing the processor, when executed, to receive the data through the user interface. The data is stored in the normal area, and a quantity of information in the stored data is identified. At least one key is selected from the plurality of keys stored in the memory, based on at least the quantity of information, the data is encrypted using the at least one key, and the encrypted data and information indicating the at least one key are transmitted to the secure area, which requires access authority.

According to an embodiment, a method of operating an electronic device is provided. Data corresponding to a user input is received through a user interface of the electronic device. The data is stored in a normal area of a memory of the electronic device. A quantity of information in the stored data is identified. At least one key is selected from a plurality of keys stored in the memory, based on at least the quantity of information. The data is encrypted using the at least one key. The encrypted data and information indicating the at least one key are transmitted to a secure area of the memory, which requires access authority.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
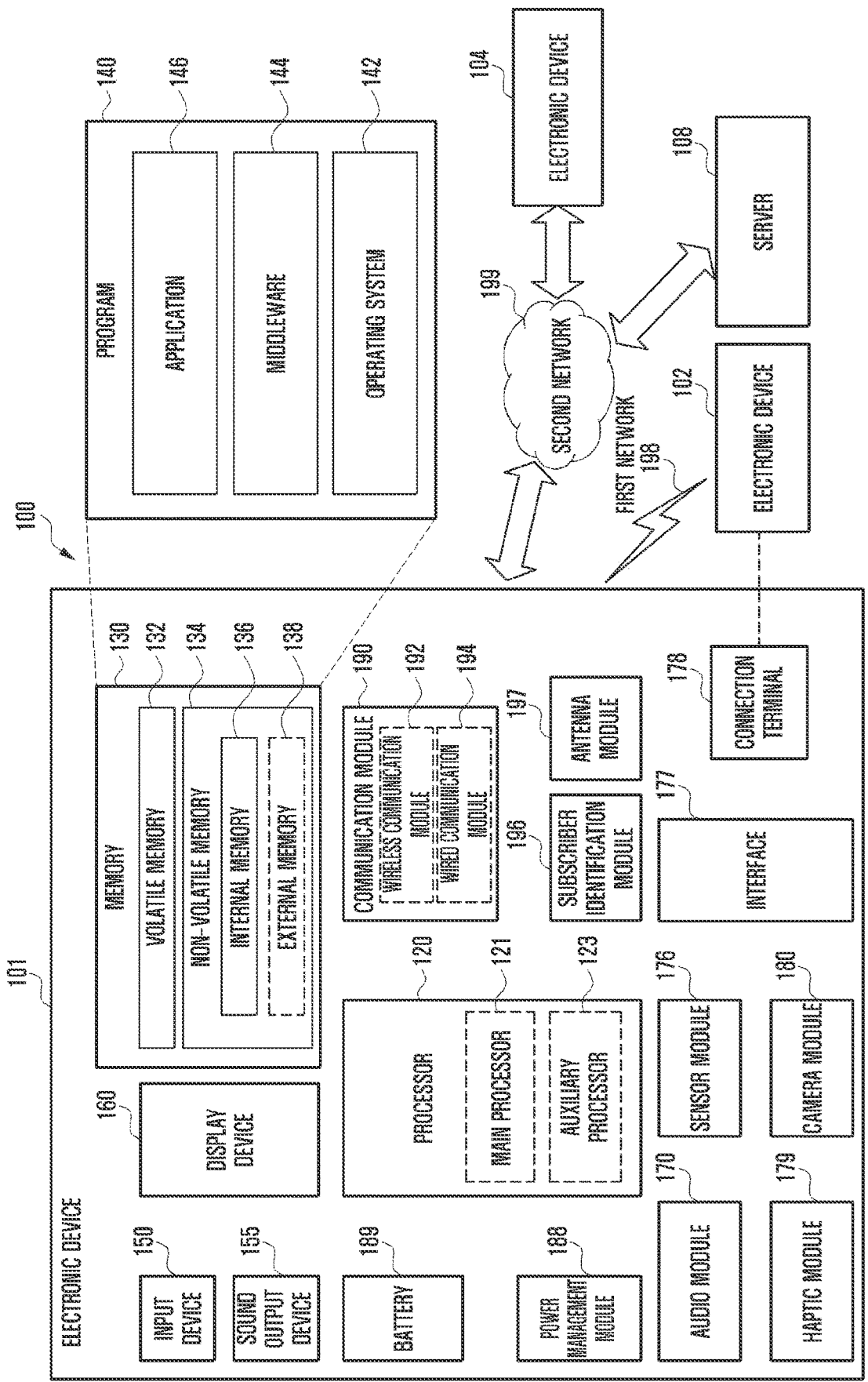
FIG. 1 is a block diagram illustrating an electronic device, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
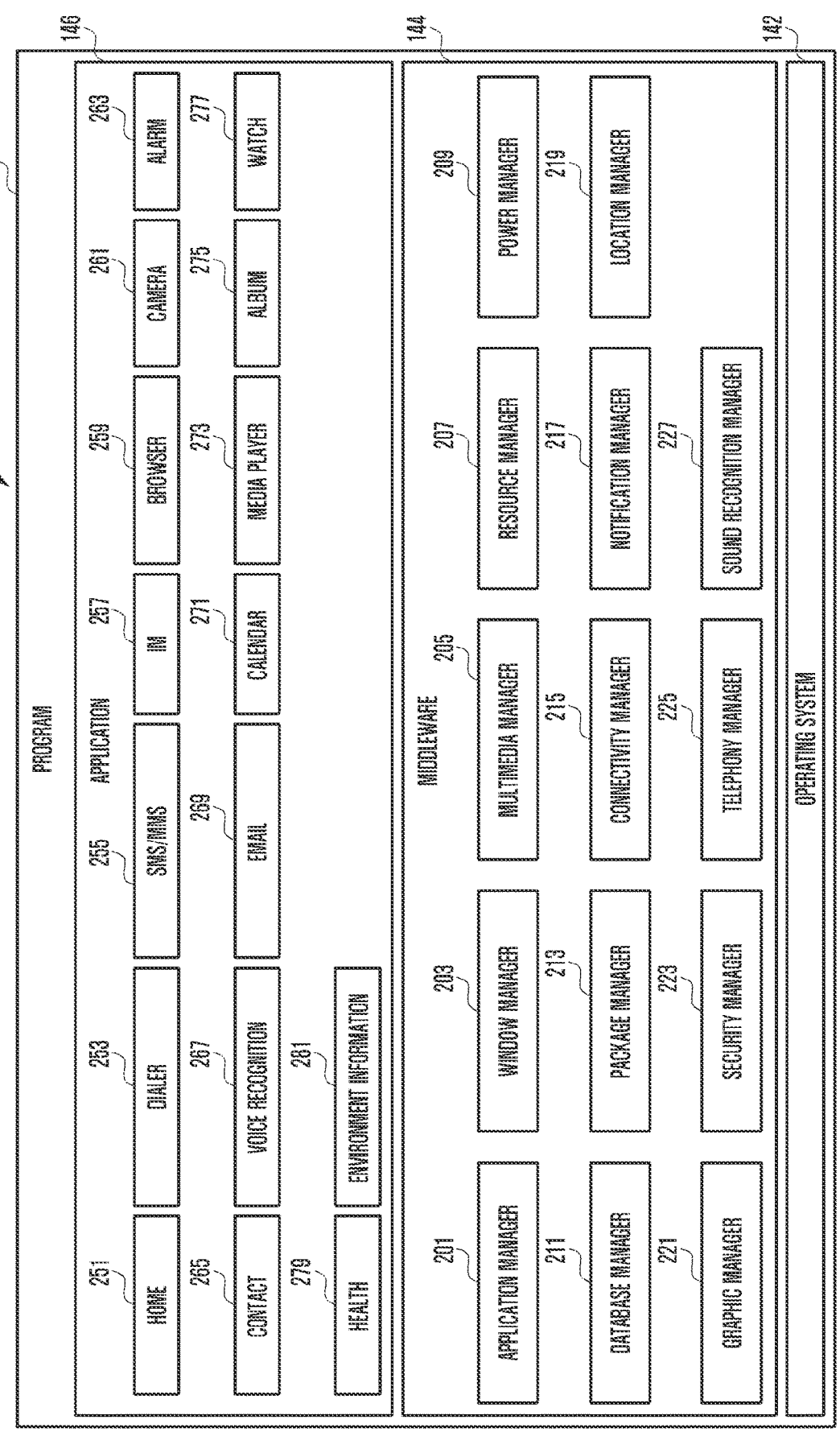
FIG. 2 is a block diagram illustrating a program, according to an embodiment.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

According to an embodiment, an electronic device and a method of operating an electronic device can improve security of the electronic device by encrypting input data, transmitting the encrypted data to a secure area, and deleting data existing in a normal area.

According to an embodiment, an electronic device and a method of operating an electronic device can improve security of data since encrypted data is exposed even though data transmitted/received within the electronic device is exposed to an attacker.

According to an embodiment, an electronic device and a method of operating an electronic device can select a size of a key to be used for encryption of data based on a quantity of information in the input data, so as to prevent a decline of encryption speed that may be generated when a small quantity of information in the input data is encrypted using a key having an excessively large size.

Figure 3:
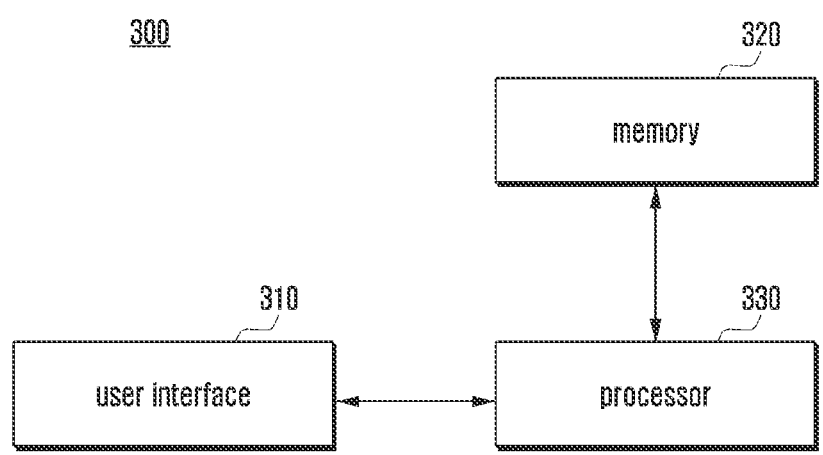
FIG. 3 is a block diagram of an electronic device, according to an embodiment.

FIG. 3 is a block diagram of an electronic device, according to an embodiment.

An electronic device 300 includes a user interface 310, a memory 320, and a processor 330.

According to an embodiment, the user interface 310 may receive a user input corresponding to data to be encrypted based on the control of the processor 330. The user input may be the inputting of a password for various functions that can be provided by the electronic device 300. For example, the user input may be the inputting of a password for switching a locked state, in which at least some functions are deactivated, to an unlocked state, in which at least some functions are activated. The password may be data implemented by a combination of letters/numbers, data implemented by pattern information in various forms that can be input into a display, data implemented by a user's biometric information (for example, various pieces of biometric information including a user's fingerprint, iris, or face), or data of various types that can be implemented in the future.

The user interface 310 may be implemented in various forms for receiving a user input. For example, the user interface 310 may be implemented as a display. The display may display various screens based on the control of the processor 330, and may receive a user input on the display. The display may receive a user input corresponding to data to be encrypted. The display may display a screen for inputting a user input based on the control of the processor 330, receive the user input in a state in which the screen is displayed, and transmit data corresponding to the user input to the processor 330.

In another example, the user interface 310 may be a sensor module capable of acquiring a user's biometric information. The user interface 310 may be implemented in the form of a fingerprint recognition sensor capable of acquiring a user's fingerprint information in various types (for example, ultrasonic type or capacitive type), an infrared camera capable of acquiring user's iris information, and a time of flight (ToF) camera capable of acquiring a user's face information.

The memory 320 may temporarily or nontemporarily store various pieces of data. The memory 320 may transmit the temporarily or nontemporarily stored data to the processor 330. The memory 320 may store one or more keys that can be used for encryption of data corresponding to a user input, and transmit the keys stored in the memory 320 to the processor 330 in response to a request from the processor 330.

The processor 330 may encrypt the data corresponding to the user input and transmit the encrypted data to a secure area. The data corresponding to the user input may be temporarily stored in a normal area. The secure area may be an area that can be accessed in a case in which there is specific authority (for example, authority of access to the secure area or authority of correction of data stored in the secure area). The normal area may be an area that can be accessed without any specific authority. The normal area and the secure area can be implemented in the processor 330 or the memory 320.

The processor 330 may encrypt the data corresponding to the user input through various encryption schemes (for example, an RSA encryption algorithm and an elliptic curve integrated encryption scheme (ECIES) algorithm). [PLEASE DEFINE "RSA".]

The processor 330 may select a different key to be used for encryption of the input data according to a quantity of information in the input data. The quantity of information of the data may be entropy of data which is an actual security secret value of the input data (value indicating a security strength according to the length of data).

For example, when it is assumed that the input data (for example, 01234) is data of a five-digit number including only numbers, the total number of pieces of data which can be implemented in every digit is 10, that is, 0 to 9, and thus, the quantity of information in the input data may be $10^5$. In another example, when it is assumed that the input data (for example, AaBbC) is data of five-digits including only letters, the total amount of data that can be implemented in one digit is 52, that is, A to Z and a to z, and thus, the quantity of information in the input data may be $52^5$. In another example, when it is assumed that the input data (for example, aAbC45) is data of six-digits including letters and numbers, the total number of data that can be implemented in one digit is 62, that is, 0 to 9, a to z, and A to Z, and thus, the quantity of information in the input data may be $62^6$. In another example, when it is assumed that the input data (for example, AaB4@) is data of five-digits including letters, numbers, and special characters, the total amount of data that can be implemented in one digit is 80, that is, 0 to 9, a to z, A to Z, and the number of special characters that can be input (assumed as 16), and thus, the quantity of information in the input data may be $80^5$.

The example of calculating the quantity of information of the data is a single embodiment, and the processor 330 may identify the quantity of information through various schemes. The processor 330 may identify the quantity of information through various schemes according to attributes of the input data (for example, attributes indicating whether the input data corresponds to a data type implemented by a combination of letters/numbers or a data type implemented by a user's biometric information).

The processor 330 may identify types of elements (for example, letter, number, or special character) included in the input data and the number of elements included in the data, and may identify the quantity of information of the data based on the types and the number of elements.

The processor 330 may select one of a plurality of keys stored in the memory 320 based on the identified quantity of information of the data.

The plurality of keys stored in the memory 320 may have different sizes, and the memory 320 may store data to which a range of the quantity of information and information indicating the key are mapped to use different keys depending on the quantity of information. The information indicating the key may be information (key size data) indicating the size of the key or information (index) indicating the key.

The memory 320 may store data to which the range of the quantity of information and the information indicating key are mapped to use a key having a larger size as the quantity of information increases. Alternatively, the memory 320 may store data to which the range of the quantity of information and the information indicating key are mapped to use a key having a smaller size as the quantity of information decreases. The data to which the range of the quantity of information and the information indicating the key are mapped may be implemented in various forms. For example, the memory 320 may store data to which the range of the quantity of information and the information indicating the key are mapped in the form of a table as shown in Table 1 or Table 2 below.

TABLE 1

| Information quantity (X) | Key size |
| --- | --- |
| $X < 52^4$ | 512 |
| $52^4 < X < 80^6$ | 1024 |
| ... | ... |
| $80^6 < X < 80^{16}$ | 4096 |

TABLE 2

| Information quantity (X) | Key index |
| --- | --- |
| $X < 52^4$ | 1 |
| $52^4 < X < 80^6$ | 2 |
| ... | ... |
| $80^6 < X < 80^{16}$ | N |

Referring to Table 1, as the quantity of information (X) of input data increases, the size of a key used for encryption of the input data may increase. Alternatively, as the quantity of information (X) of input data decreases, the size of a key used for encryption of the input data may decrease. The size of the key may be the number of bits of the key. The memory 320 may store data to which a range of the quantity of information and information indicating a key to be used for encryption of data are mapped in various forms (for example, the table shown in Table 1). The data to which the range of the quantity of information and the information indicating the key are mapped may be stored in another area that can be accessed in all of the normal area, the secure area, or the normal area and the secure area.

The processor 330 may identify the quantity of information in the input data and identify the range of the quantity of information. The processor 330 may select a key to be used for encryption of the input data among the plurality of keys based on the range of the quantity of information and the information indicating the key. The plurality of keys may be stored in the secure area and the normal area. When a password is configured, the processor 330 may identify the quantity of information and identify a range of the quantity of information. The processor 330 may select a key to be used for encryption of the input data among the plurality of keys based on the range of the quantity of information and the information indicating the key. After receiving a user input, the processor 330 may encrypt data corresponding to the user input using a preselected key without identifying the quantity of information.

The processor 330 may encrypt the input data based on the selected key. Encryption of the input data may be performed in the normal area based on the control of the processor 330.

The processor 330 may identify a certificate corresponding to each of the plurality of keys stored in the normal area. The certificate may be data for verifying reliability of the secure area or the key. The processor 330 may determine whether to encrypt the input data and whether to transmit the encrypted data to the secure area based on the identification result of the certificate.

The processor 330 may transmit the encrypted data or information indicating the selected key (for example, information indicating the size of the selected key in Table 1 or the index indicating the selected key in Table 2) to the secure area.

The data corresponding to the user input stored in the normal area may be automatically deleted after encryption is completed. The encrypted data may be stored in the secure area. Since the data corresponding to the user input is not stored in the normal area of the memory 320 and access to the secure area needs separate authority, security of the electronic device 300 can be improved.

Even though data transmitted/received within the electronic device 300 is exposed to an attacker, encrypted data is exposed due to encryption of the data corresponding to the user input, and thus, security of the data can be improved.

Since the size of the key to be used for encryption may be selected based on the quantity of information in the input data, it is possible to prevent the encryption speed from declining, which may occur when encrypting data having a small quantity of information using a key having the excessively large size.

The processor 330 may identify, in the secure area, information indicating encrypted data, which is the result of encryption performed in the normal area, and the key used for encryption. The processor 330 may select one of a plurality of keys stored in the secure area based on information indicating the key used for encryption. The processor 330 may decrypt the encrypted data in the secure area using the selected key.

The processor 330 may perform an operation corresponding to the user input based on the decrypted data. For example, when the user input is the inputting of a password for switching the locked state of the electronic device 300 to the unlocked state, the processor 330 may identify whether the input password is the same as a preset password based on the decrypted data, and may switch the electronic device 300 from the locked state to the unlocked state based on the identification result. For example, when the user input is a user input of inputting a password for activating various services (for example, financial services) that the electronic device 300 can provide, the processor 330 may identify whether the input password is the same as a preset password based on the decrypted data, and may determine whether to activate the various services based on the identification result.

The password may be data implemented by a combination of characters/numbers, data implemented by pattern information in various forms that can be input into a display, data implemented by a user's biometric information (for example, various pieces of biometric information including a user's fingerprint, iris, or face), or data of various types that can be implemented in the future.

The processor 330 may encrypt the input data through an encryption scheme (for example, an RSA encryption algorithm or an ECIES algorithm) using a public key and a private key.

The memory 320 may include a public key and a private key, and may store a plurality of key sets having different sizes of data. The plurality of key sets may have different sizes, and a public key and a private key included in one key set may have the same size. The processor 330 may identify a quantity of information in the input data and select one of the plurality of key sets corresponding to the quantity of information. The processor 330 may encrypt the input data in the normal area by using the public key included in the selected key set. The processor 330 may move the encrypted data and information indicating the selected key set from the normal area to the secure area. The processor 330 may identify the key set used for encryption of the encrypted data based on the information indicating the selected key set in the secure area. The processor 330 may decrypt the encrypted data using the private key included in the identified key set. The private key may be stored in the secure area of the memory 320, and the public key may be stored in the normal area of the memory 320.

The normal area and the secure area include the public key and the private key and may have a plurality key sets having different sizes of data. The plurality of key sets may have different sizes, and a public key and a private key included in one key set may have the same size. The processor 330 may identify a quantity of information in the input data and may select one of the plurality of key sets stored in the normal area based on the quantity of information. The processor 330 may encrypt the input data in the normal area by using the public key in the secure area included in the selected key set and the private key in the normal area. The processor 330 may move the encrypted data and information indicating the selected key set from the normal area to the secure area. The processor 330 may identify the key set used for encryption of the encrypted data based on the information indicating the selected key set in the secure area. The processor 330 may decrypt the encrypted data using the public key in the normal area included in the identified key set and the private key in the secure area.

The above-described embodiments assume that the encryption keys have been generated in advance, but the electronic device 300 may newly generate an encryption key according to a data input, according to another embodiment. The processor 330 may generate a predetermined encryption key having a length that is the same as a length of the input data. The predetermined encryption key may be one-time data used for encrypting the input data. The processor 330 may encrypt the input data (for example, perform the exclusive OR operation (XOR operation) using the predetermined encryption key and the input data) based on the predetermined encryption key, and may transmit the encrypted data to the secure area. The processor 330 may decrypt the encrypted data (for example, perform the XOR operation again on the encrypted data on which the XOR operation has been performed) transmitted to the secure area.

Figure 4:
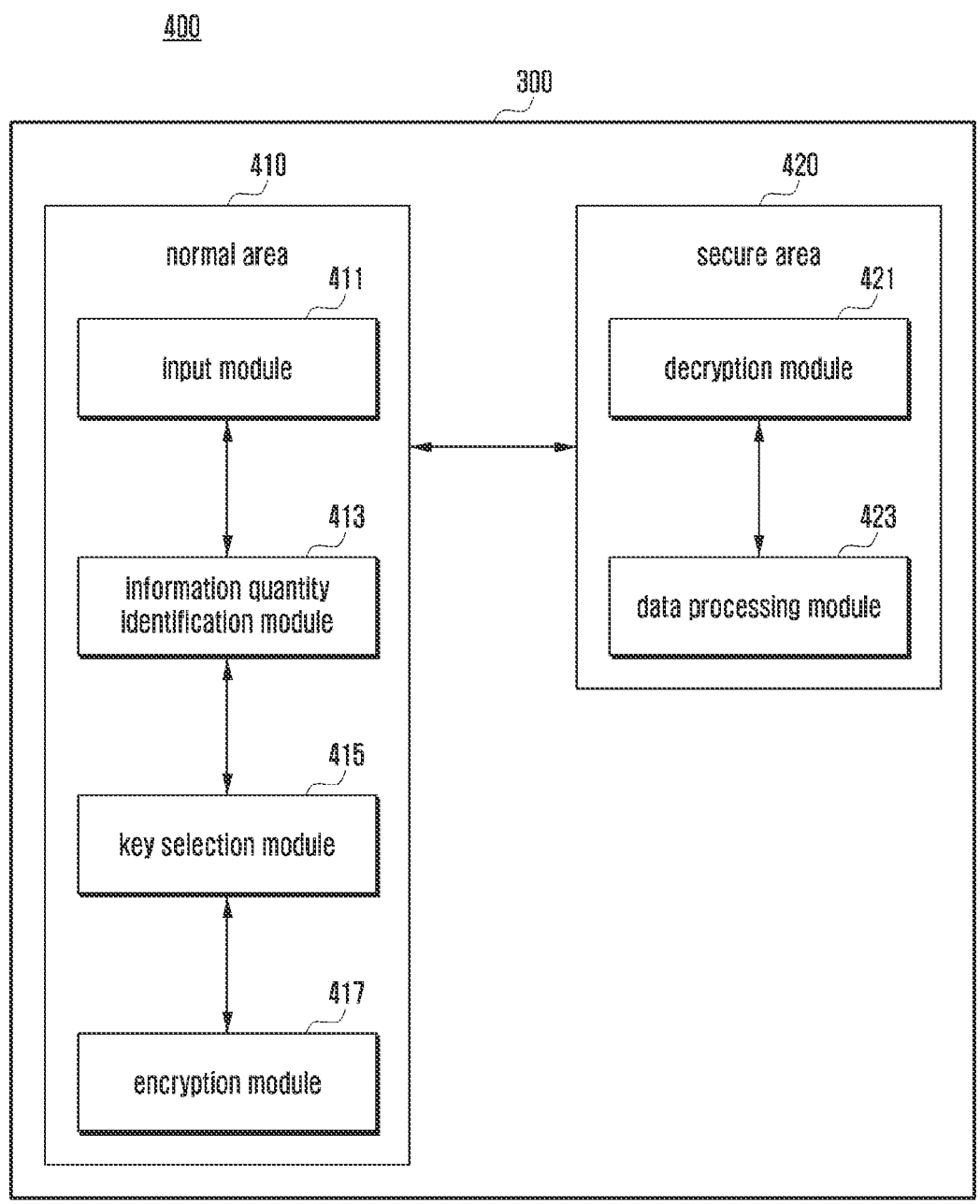
FIG. 4 is a block diagram illustrating a normal area and a secure area in an electronic device, according to an embodiment.

FIG. 4 is a block diagram illustrating the normal area and the secure area in the electronic device, according to an embodiment.

Referring to FIG. 4, the electronic device 300 of block diagram 400 implements a normal area 410 and a secure area 420. The normal area 410 and the secure area 420 may be areas divided according to the operation of a processor. The normal area 410 may be an area to which access is possible without any separate access authority. The secure area 420 may be an area that requires separate access authority.

The normal area 410 may encrypt data corresponding to a user input and transmit the encrypted data to the secure area 420. The secure area 420 may receive the encrypted data and decrypt the encrypted data. The secure area 420 may perform an operation corresponding to the user input based on the decrypted data.

The normal area 410 includes an input module 411, an information quantity identification module 413, a key selection module 415, and an encryption module 417.

The input module 411 may control a user interface to display a screen for receiving a user input. The input module 411 may receive the user input through the user interface 310 and transmit data corresponding to the user input to the information quantity identification module 413.

The information quantity identification module 413 may receive the data transmitted by the input module 411 and identify the quantity of information of the data. The quantity of information may be entropy of the data, which is a value related to the number of cases of data having the same size as the input data.

The information quantity identification module 413 may identify types of elements (for example, letter, number, or special character) included in the input data, the number of elements included in the data, and the quantity of information of the data based on the types and the number of elements.

The key selection module 415 may select one of a plurality of keys based on the quantity of information identified by the information quantity identification module 413. The selected key may be used for encryption of the data.

The plurality of keys may have different sizes and are mapped with values related to the quantity of information of the data. The key selection module 415 may identify the quantity of information of the data, and may select a key corresponding to the quantity of information.

The encryption module 417 may encrypt the data received by the input module 411 using the key selected by the key selection module 415. The encryption module 417 may transmit the encrypted data and information indicating the key used for encryption of the data to the secure area 420. The information indicating the key used for encryption of the data may be information (key size data) indicating the size of the key and information (index) indicating the key.

The secure area 420 includes a decryption module 421 and a data processing module 423.

The decryption module 421 may receive the data encrypted by the encryption module 417 and the information indicating the key used for encryption of the data. The decryption module 421 may identify a key used for encryption based on the information indicating the key. The decryption module 421 may decrypt the encrypted data using the identified key. The decryption module 421 may transmit the decrypted data to the data processing module 423.

The data processing module 423 may process the decrypted data transmitted by the decryption module 421. Processing the decrypted data may be performing an operation corresponding to the user input. For example, when the user input is the inputting of a password for switching the electronic device 300 from the locked state to the unlocked state, the data processing module 423 may identify whether a correct password is input based on the decrypted data, and may switch the electronic device 300 from the locked state to the unlocked state based on the identification result. For example, when the user input is a user input of inputting a password for activating various services (for example, financial services) that the electronic device 300 can provide, the data processing module 423 may identify whether a correct password is input based on the decrypted data, and may determine whether to activate the various services that the electronic device 300 can provide based on the identification result.

An electronic device, according to an embodiment, may include a user interface, a processor operatively connected to the user interface, and a memory operatively connected to the processor and including a normal area and a secure area. The memory may be configured to store a plurality of keys for encrypting data corresponding to a user input, and to store instructions causing the processor, when executed, receive the data through the user interface. The data is stored in the normal area. A quantity of information in the data is identified, and at least one key from the plurality of keys stored in the memory, based on at least the quantity of information. The data is encrypted using the at least one key, and the encrypted data and information indicating the at least one key are transmitted to the secure area, which requires access authority.

In the electronic device, the instructions may further cause the processor to identify the at least one key used for encryption of the encrypted data, based on the information indicating the at least one key, and decrypt the encrypted data stored in the secure area by using the at least one key.

In the electronic device, the instructions may further cause the processor to identify a certificate corresponding to the at least one key, authenticate the at least one key based on the certificate, and determine whether to perform an encryption operation of the input data, based on a result of the authentication.

In the electronic device, the plurality of keys stored in the memory may be configured to have different sizes of data, a public key of the plurality of keys is stored in the normal area of the memory, and a private key of the plurality of keys is stored in the secure area of the memory.

In the electronic device, the memory may be configured to further store information indicating a key to be used according to a range of the quantity of information in the data, and the instructions further cause the processor to select the key mapped to the range of the quantity of information.

In the electronic device, information indicating the key to be used may include information mapped such that a size of the key used for encryption of the input data increases according to the size of the data.

In the electronic device, the instructions may further cause the processor to generate a predetermined key having a length equal to a length of the data, and encrypt the data by using the predetermined key.

In the electronic device, the predetermined key may be configured to have a quantity of information quantity greater than or equal to the quantity of information in the data.

In the electronic device, the memory may include a public key and a private key and may be configured to store a plurality of key sets having different sizes of data, and the instructions further cause the processor to select a key set from the plurality of key sets, based on the quantity of information in the input data, encrypt the data by using the public key included in the key set, and transmit the encrypted data or information indicating the key set to the secure area.

In the electronic device, the instructions may further cause the processor to decrypt the encrypted data by using the private key included in the key set on the basis of the information indicating the key set.

Figure 5:
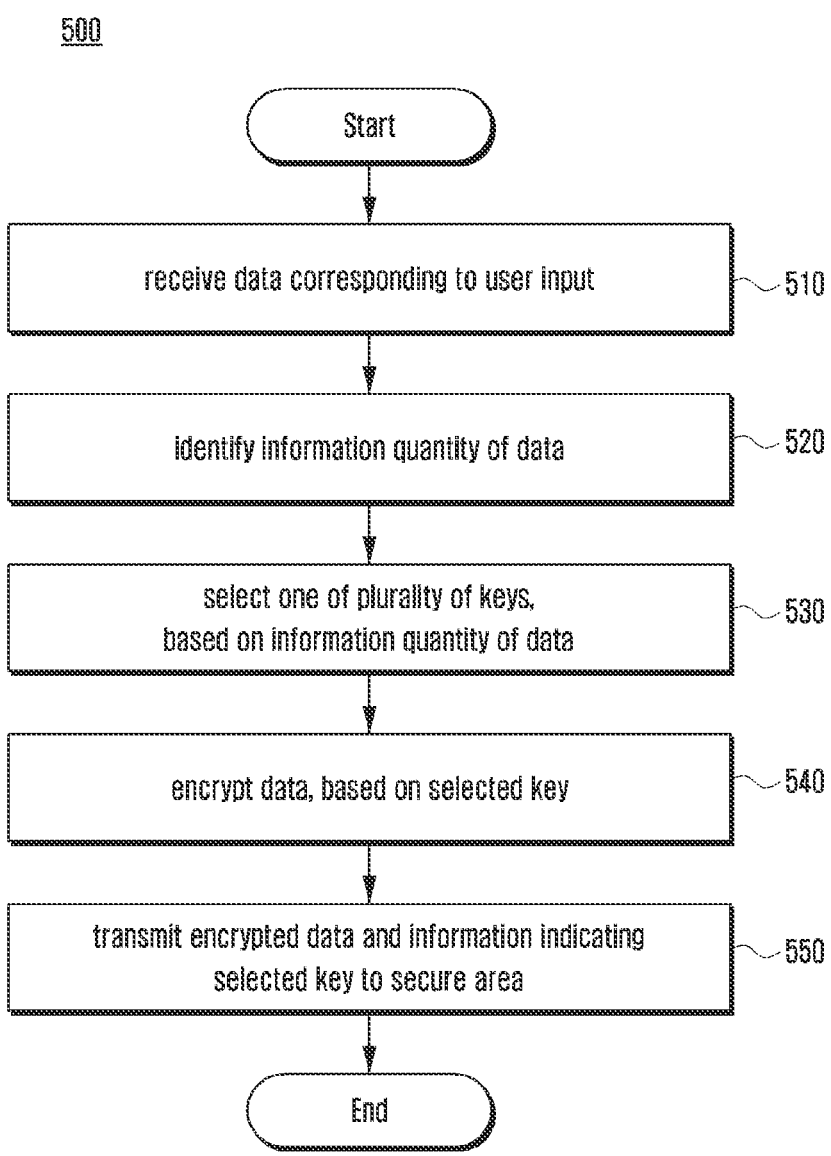
FIG. 5 is a flowchart illustrating a method of operating an electronic device, according to an embodiment.

FIG. 5 is a flowchart illustrating a method of operating an electronic device, according to an embodiment.

Referring a flowchart 500 of FIG. 5, in a method of operating an electronic device, an electronic device may receive data corresponding to a user input.

In step 510, the electronic device 300 receives the user input corresponding to the data to be encrypted through a user interface.

The user input may be a user input of inputting a password for various functions that the electronic device 300 can provide. For example, the user input may be the of inputting of a password for switching a locked state, in which at least some functions are deactivated, to an unlocked state, in which at least some functions are activated. The password may be data implemented by a combination of characters/numbers, data implemented by pattern information in various forms that can be input into a display, data implemented by a user's biometric information (for example, various pieces of biometric information including a user's fingerprint, iris, or face), or data of various types that can be implemented in the future.

The user interface 310 may be implemented in various forms for receiving a user input. For example, the user interface 310 may be implemented as a display. The display may display various screens based on the control of the processor 330, and may receive a user input on the display. The display may receive a user input corresponding to data to be encrypted. The display may display a screen for inputting a user input based on the control of the processor 330, receive the user input in a state in which the screen is displayed, and transmit data corresponding to the user input to the processor 330. In another example, the user interface 310 may be a sensor module capable of acquiring user's biometric information. The user interface 310 may be implemented in the form of a fingerprint recognition sensor capable of acquiring a user's fingerprint information in various types (for example, ultrasonic type or capacitive type), an infrared camera capable of acquiring a user's iris information, and a ToF camera capable of acquiring a user's face information.

In step 520, the electronic device 300 identifies a quantity of information of data.

The quantity of information may be entropy of the data corresponding to a value related to the number of cases of data having the same size as the input data. The electronic device 300 may identify types of elements (for example, letter, number, or special character) included in the input data, the number of elements included in the data, and the quantity of information of the data based on the types and the number of elements.

In step 530, the electronic device 300 selects one of a plurality of keys based on the quantity of information of the data.

The plurality of keys may be stored in the memory 320. The plurality of keys may have different sizes, and the memory 320 may store data to which a range of the quantity of information and information indicating the key are mapped, in order to use different keys according to the quantity of information. The information indicating the key may be information (key size data) indicating the size of the key or information (index) indicating the key.

The electronic device 300 may select a key corresponding to the quantity of information.

In step 540, the electronic device 300 encrypts the data by using the selected key.

Encryption of the input data may be performed in the normal area based on the control of the processor 330.

In step 550, the electronic device 300 transmits the encrypted data and information indicating the selected key to the secure area.

The data corresponding to the user input stored in the normal area may be automatically deleted after encryption is completed. The encrypted data may be stored in the secure area. The data corresponding to the user input may not be stored in the normal area of the memory 320, and access to the secure area demands separate authority, and thus, security of the electronic device 300 can be improved.

Due to encryption of the data corresponding to the user input, the encrypted data is exposed even though data transmitted/received within the electronic device 300 is exposed to an attacker, and thus, security of the data can be improved.

Figure 6:
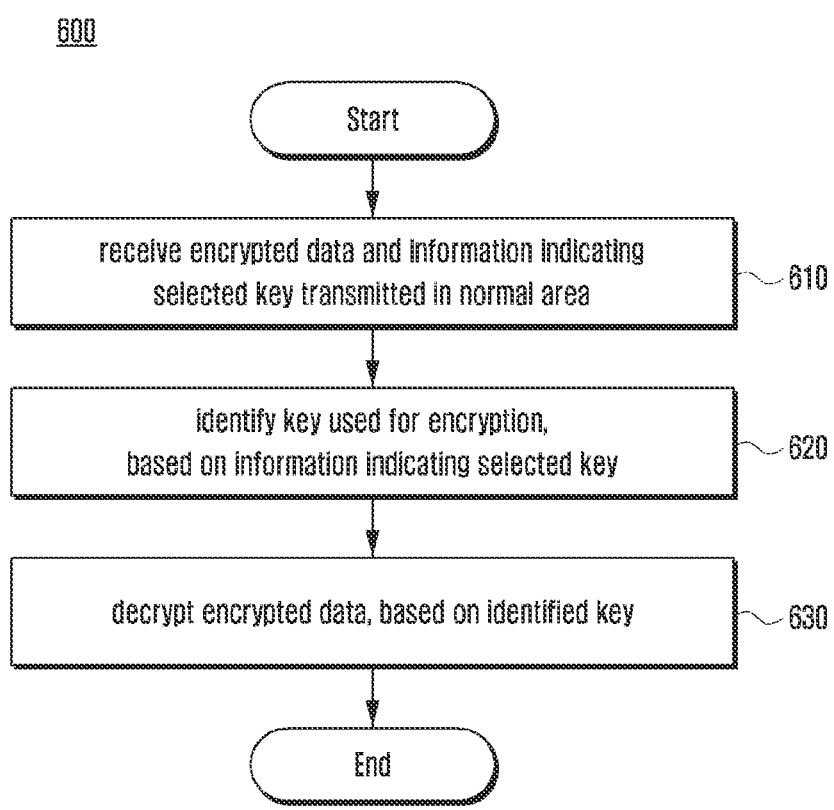
FIG. 6 is a flowchart illustrating a method of operating an electronic device, according to an embodiment.

FIG. 6 is a flowchart illustrating a method of operating an electronic device, according to an embodiment.

Referring to a flowchart 600 of FIG. 6, an electronic device receives encrypted data and information indicating a selected key transmitted from a normal area in step 610.

The electronic device 300 identifies a key used for encryption based on the information indicating the selected key, in step 620.

The information indicating the selected key may be information indicating the size of the key (key size data) or information (index) indicating the key.

The electronic device 300 decrypts the encrypted data using the identified key, in step 630.

The electronic device 300 may perform an operation corresponding to a user input based on the decrypted data. For example, when the user input is the inputting of a password for switching the electronic device 300 from the locked state to the unlocked state, the electronic device 300 may identify whether a correct password is input based on the decrypted data, and may switch the electronic device 300 to the locked state to the unlocked state based on the identification result. For example, when the user input is the inputting of a password for activating various services (for example, financial services) that the electronic device 300 can provide, the electronic device 300 may identify whether a correct password is input based on the decrypted data, and may determine whether to activate the various services based on the identification result.

A method of operating an electronic device, according to an embodiment, includes an operation of receiving data corresponding to a user input through a user interface of the electronic device. The data is stored in a normal area of a memory of the electronic device, and a quantity of information in the data is identified. At least one key is selected from a plurality of keys stored in the memory based on at least the quantity of information, and the data is encrypted using the at least one key. The encrypted data and information indicating the at least one key are transmitted to a secure area of the memory, which requires access authority.

The method of operating the electronic device may further include an operation of identifying the at least one key used for encryption of the encrypted data, based on the information indicating the at least one key, and an operation of decrypting the encrypted data stored in the secure area by using the at least one key.

The method of operating the electronic device may further include an operation of identifying a certificate corresponding to the at least one key, an operation of authenticating the at least one key based on the certificate, and an operation of determining whether to decrypt the encrypted data based on a result of the authentication.

In the method of operating the electronic device the plurality of keys stored in the memory may be configured to have different sizes of data, a public key of the plurality of keys may be stored in the normal area of the memory, and a private key of the plurality of keys may be stored in the secure area of the memory.

The method of operating the electronic device may further include an operation of identifying information indicating a key to be used for encryption according to a range of the quantity of information in the data, and an operation of selecting the key mapped to the range of the quantity of information.

In the method of operating the electronic device, information indicating the key to be used may include information mapped such that a size of the key used for encryption of the input data increases according to the size of the data.

The method of operating the electronic device may further include an operation of generating a predetermined key having a length equal to a length of the data, and an operation of encrypting the data by using the predetermined key.

In the method of operating the electronic device, the predetermined key may be configured to have a quantity of information greater than or equal to the quantity of information in the data.

The method of operating the electronic device may further include an operation of selecting a key set from a plurality of key sets including a public key and a private key based on the quantity of information quantity in the input data, an operation of encrypting the data by using the public key included in the key set, and an operation of transmitting the encrypted data or information indicating the key set to the secure area.

The method of operating the electronic device may further include an operation of decrypting the encrypted data by using the private key included in the key set based on the information indicating the key set.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a user interface;
    a processor operatively connected to the user interface; and
    a memory operatively connected to the processor and comprising a normal area and a secure area,
    wherein the memory is configured to store a plurality of keys for encrypting data corresponding to a user input, and to store instructions causing the processor, when executed, to:
    receive the data through the user interface;
    store the data in the normal area;
    identify a quantity of information in the data;
    select at least one key from the plurality of keys stored in the memory, based on at least the quantity of information;
    encrypt the data using the at least one key; and
    transmit the encrypted data and information indicating the at least one key to the secure area, which requires access authority, and
    wherein the memory is configured to further store information indicating a key to be used according to a range of the quantity of information in the data, and the instructions further cause the processor to select the key mapped to the range of the quantity of information,
    wherein the quantity of information is identified according to attributes of the input data, and
    wherein the attributes indicate whether the input data corresponds to a data type implemented by a combination of letter, number, and/or especial character.

2. The electronic device of claim 1, wherein the instructions further cause the processor to:
    identify the at least one key used for encryption of the encrypted data, based on the information indicating the at least one key; and
    decrypt the encrypted data stored in the secure area by using the at least one key.

3. The electronic device of claim 2, wherein the instructions further cause the processor to:
    identify a certificate corresponding to the at least one key;
    authenticate the at least one key, based on the certificate; and
    determine whether to perform an encryption operation of the input data, based on a result of the authentication.

4. The electronic device of claim 1, wherein the plurality of keys stored in the memory are configured to have different sizes of data, a public key of the plurality of keys is stored in the normal area of the memory, and a private key of the plurality of keys is stored in the secure area of the memory.

5. The electronic device of claim 1, wherein information indicating the key to be used includes information mapped such that a size of the key used for encryption of the input data increases according to the size of the data.

6. The electronic device of claim 1, wherein the instructions further cause the processor to generate a predetermined key having a length equal to a length of the data, and encrypt the data by using the predetermined key.

7. The electronic device of claim 6, wherein the predetermined key is configured to have a quantity of information greater than or equal to the quantity of information in the data.

8. The electronic device of claim 1, wherein the memory comprises a public key and a private key and is configured to store a plurality of key sets having different sizes of data, and the instructions further cause the processor to:
    select a key set from the plurality of key sets, based on the quantity of information in the data;
    encrypt the data by using the public key included in the key set; and
    transmit the encrypted data or information indicating the key set to the secure area.

9. The electronic device of claim 8, wherein the instructions further cause the processor to decrypt the encrypted data by using the private key included in the key set, based on the information indicating the key set.

10. A method of operating an electronic device, the method comprising:
    receiving data corresponding to a user input through a user interface of the electronic device;
    storing the data in a normal area of a memory of the electronic device;
    identifying a quantity of information in the stored data;
    selecting at least one key from a plurality of keys stored in the memory, based on at least the quantity of information;
    encrypting the data using the at least one key; and
    transmitting the encrypted data and information indicating the at least one key to a secure area of the memory, which requires access authority,
    wherein selecting the at least one key from a plurality of keys stored in the memory comprises:
        identifying information indicating a key to be used for encryption according to a range of the quantity of information in the data; and
        selecting the key mapped to the range of the quantity of information,
    wherein the quantity of information is identified according to attributes of the input data, and
    wherein the attributes indicate whether the input data corresponds to a data type implemented by a combination of letter, number, and/or especial character.

11. The method of claim 10, further comprising:
    identifying the at least one key used for encryption of the encrypted data, based on the information indicating the at least one key; and
    decrypting the encrypted data stored in the secure area by using the at least one key.

12. The method of claim 11, further comprising:
    identifying a certificate corresponding to the at least one key;
    authenticating the at least one key, based on the certificate; and
    determining whether to perform an encryption operation of the input data, based on a result of the authentication.

13. The method of claim 10, wherein the plurality of keys stored in the memory are configured to have different sizes of data, a public key of the plurality of keys is stored in the normal area of the memory, and a private key of the plurality of keys is stored in the secure area of the memory.

* * * * *